United States Patent [19]
English, Jr.

[11] Patent Number: 5,876,173
[45] Date of Patent: Mar. 2, 1999

[54] LIFT DOLLY

[75] Inventor: Charles Lamar English, Jr., Havana, Fla.

[73] Assignee: Herculift Technologies, Inc., Havana, Fla.

[21] Appl. No.: 795,409

[22] Filed: Feb. 5, 1997

[51] Int. Cl.⁶ ..................................................... B60P 3/00
[52] U.S. Cl. ..................... 414/458; 414/495; 254/8 R; 280/79.11
[58] Field of Search ...................... 414/444, 458, 414/476, 490, 495; 280/79.11; 254/3 R, 3 C, 8 R, 8 C, 17, 120, 123

[56] References Cited

U.S. PATENT DOCUMENTS

| | | | |
|---|---|---|---|
| 723,692 | 3/1903 | Litsey | 254/8 R |
| 2,696,928 | 12/1954 | Faircloth et al. | 280/79.11 X |
| 2,840,346 | 6/1958 | Moulin | 254/8 C |
| 2,937,850 | 5/1960 | Winkler et al. | 254/8 R |
| 3,845,933 | 11/1974 | Heizer, Jr. | 254/8 R |
| 3,876,096 | 4/1975 | Latek . | |
| 4,113,235 | 9/1978 | Hartman, Jr. | 254/8 |
| 4,362,458 | 12/1982 | Jantzi | 414/458 |
| 4,533,117 | 8/1985 | Schaang | 254/94 |
| 4,639,005 | 1/1987 | Birkley | 280/79.11 X |
| 5,018,930 | 5/1991 | Hardin et al. | 414/458 |
| 5,029,814 | 7/1991 | Liegel et al. | 254/122 |
| 5,299,817 | 4/1994 | Chang | 280/79.11 X |
| 5,464,315 | 11/1995 | Palmer et al. | 414/458 |

FOREIGN PATENT DOCUMENTS

| | | | |
|---|---|---|---|
| 2604426 | 4/1988 | France | 254/123 |
| 368748 | 5/1963 | Switzerland | 414/490 |

*Primary Examiner*—James W. Keenan
*Attorney, Agent, or Firm*—Liniak & Berenato LLC

[57] ABSTRACT

A lift dolly is comprised of a first castor-based platform and a second castor-based platform. Each platform is secured to an object to be lifted such that when so secured, the first platform extends diagonally upwardly and the second platform extends diagonally upwardly and terminates below the first platform. Downward articulation of the first platform causes lever lifting of its end of the object and also engages and causes downward articulation of the second platform which lever lifts its end of the object. Through continued lifting the lever fulcrum moves toward center increasing the mechanical advantage of the device.

14 Claims, 8 Drawing Sheets

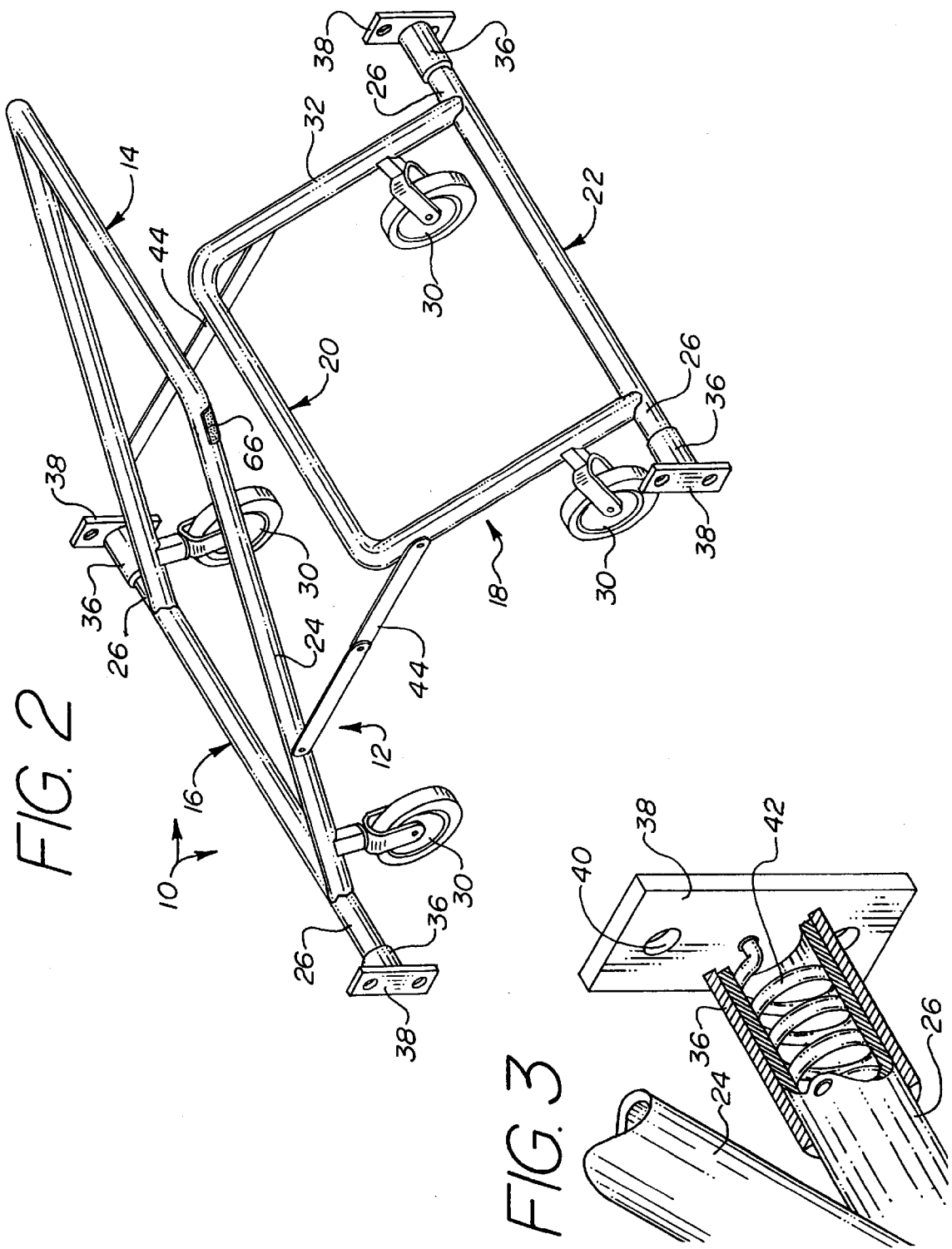

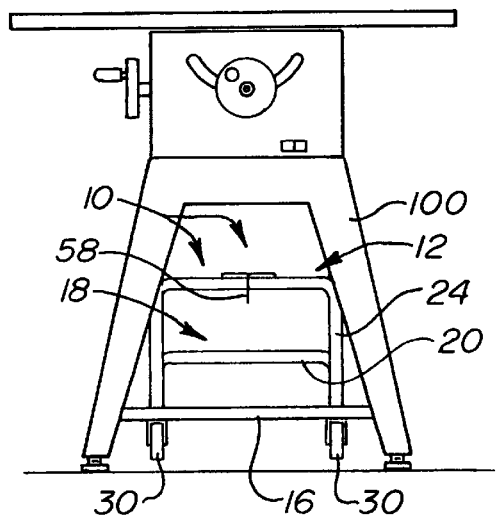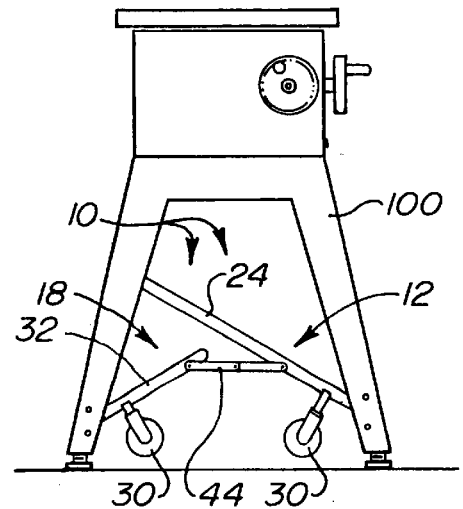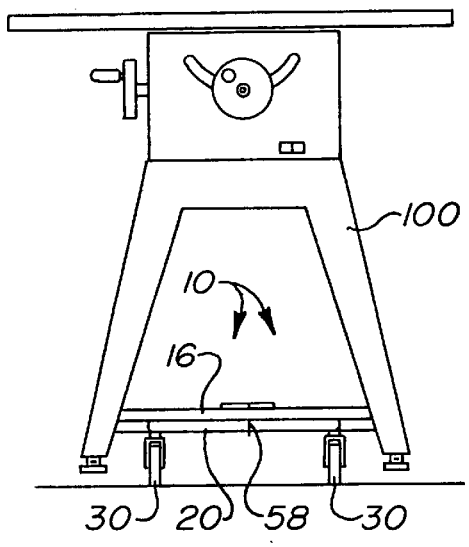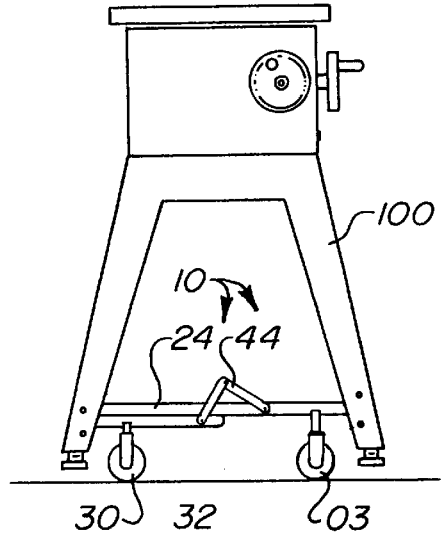

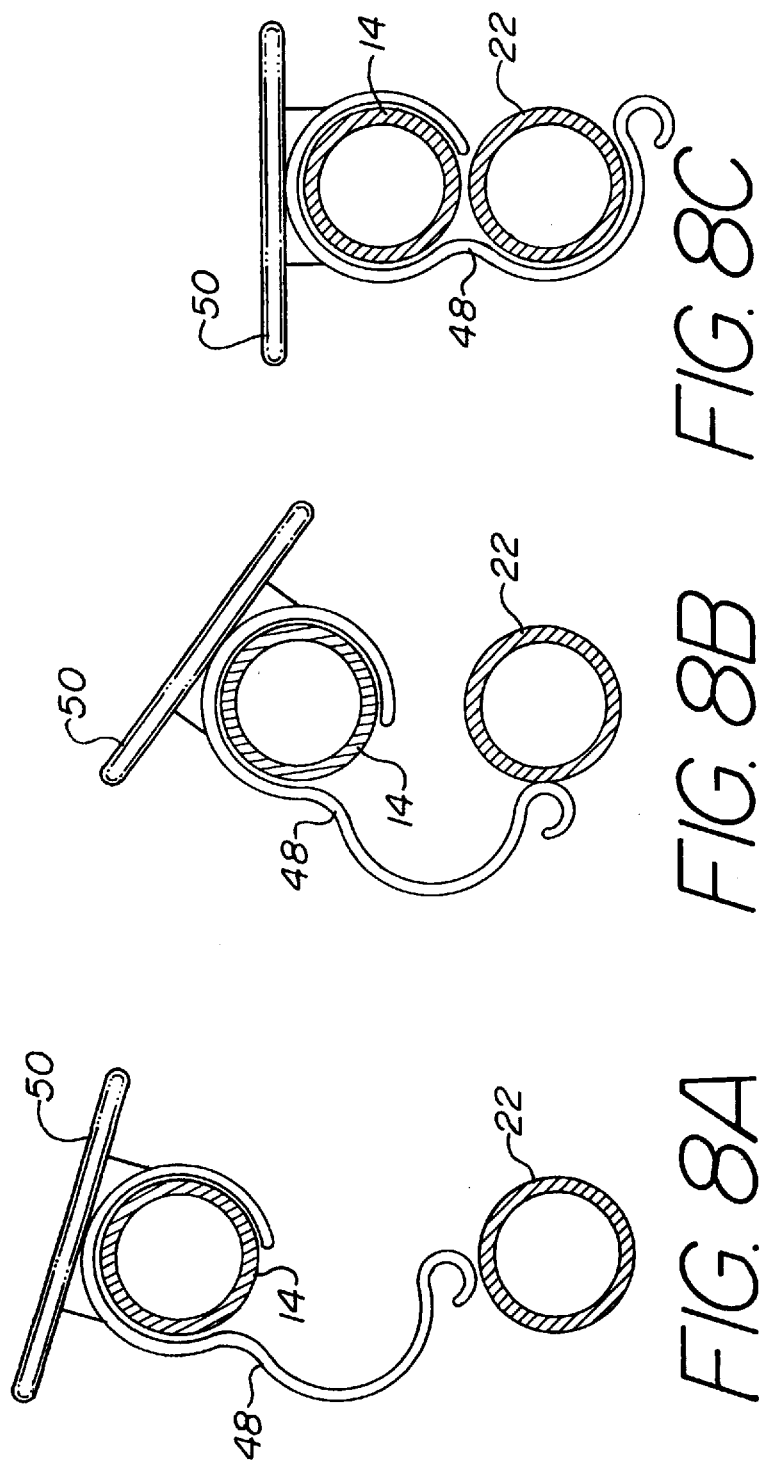

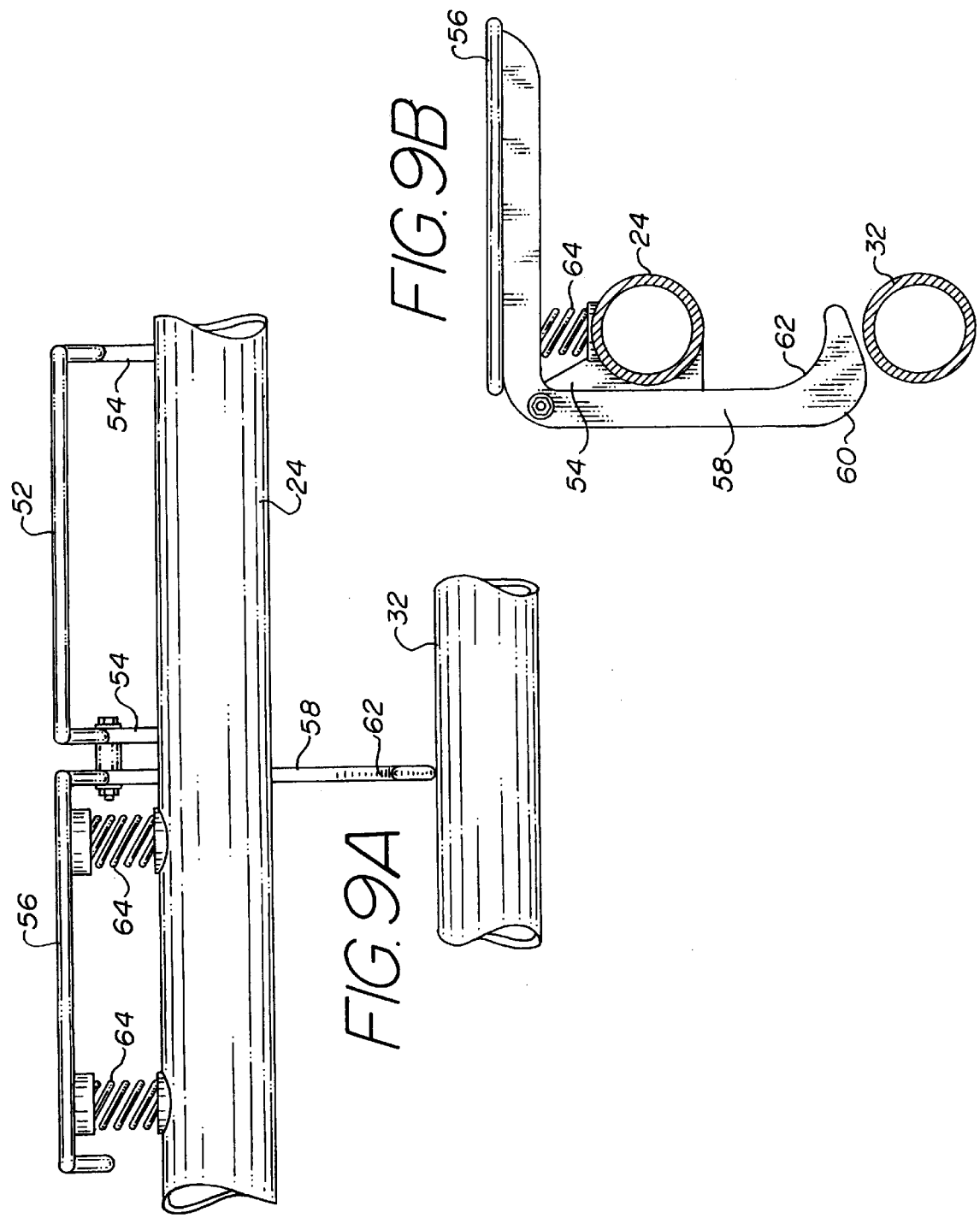

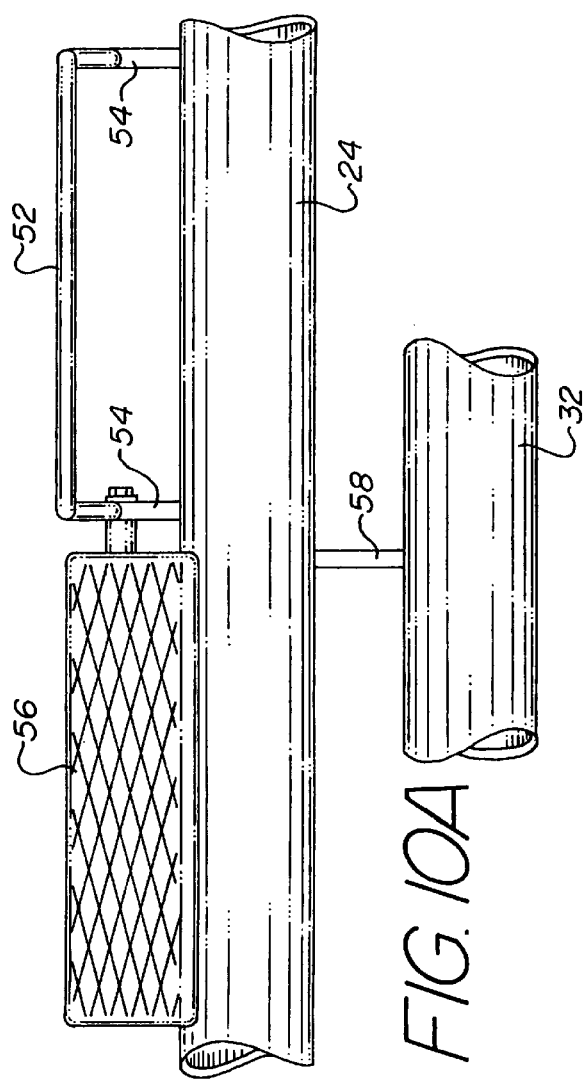
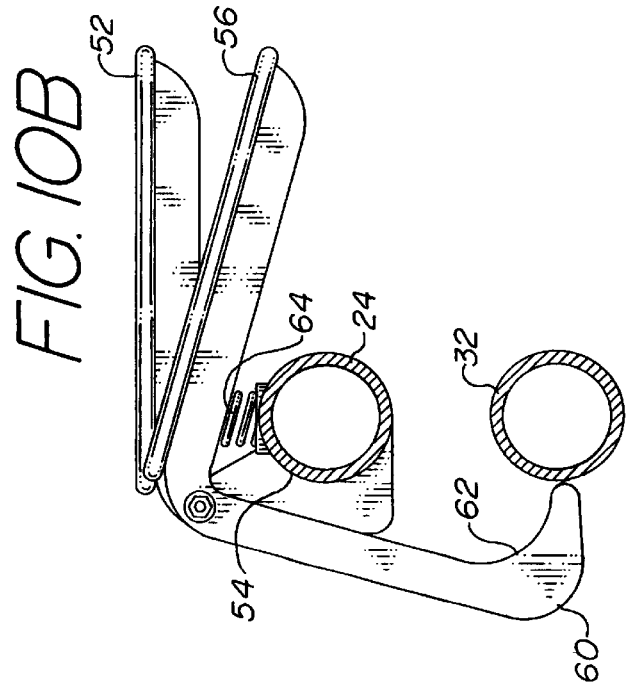
FIG.10A
FIG.10B

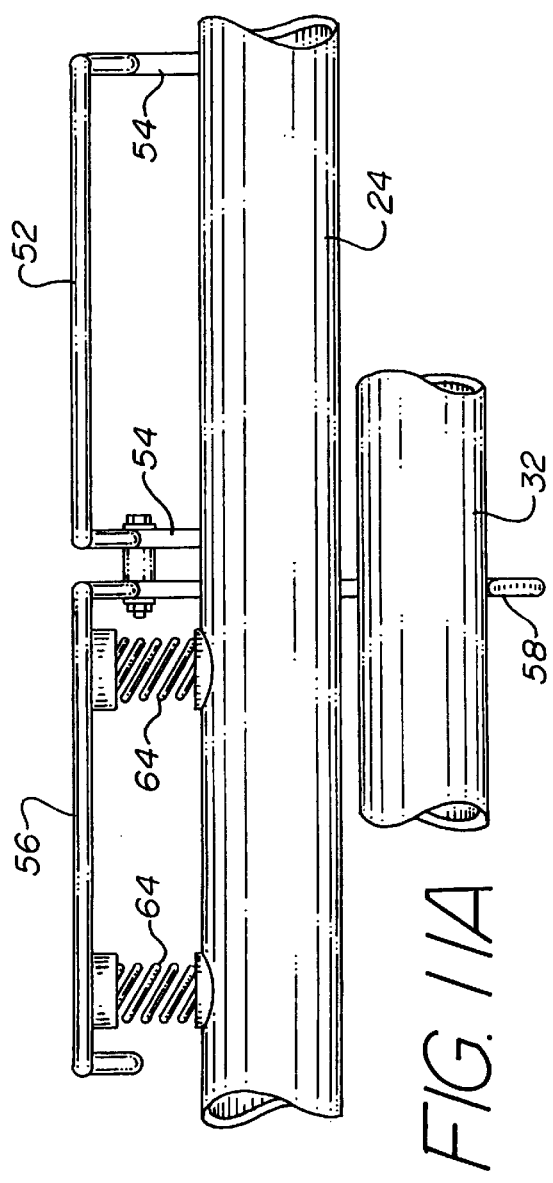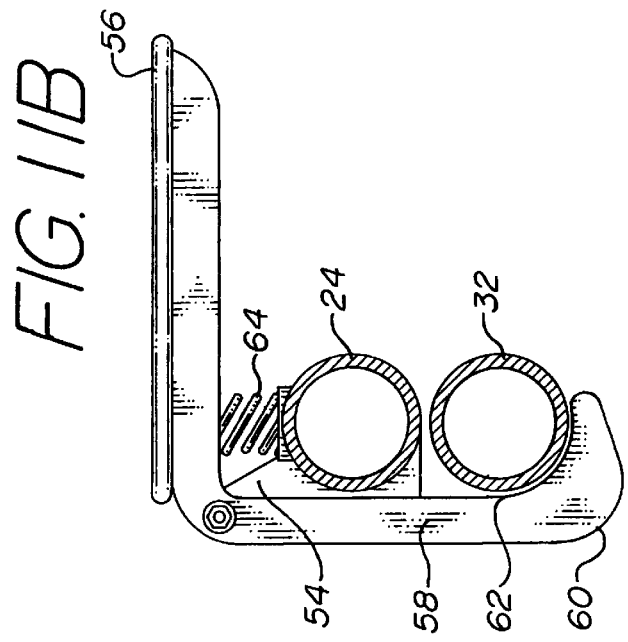

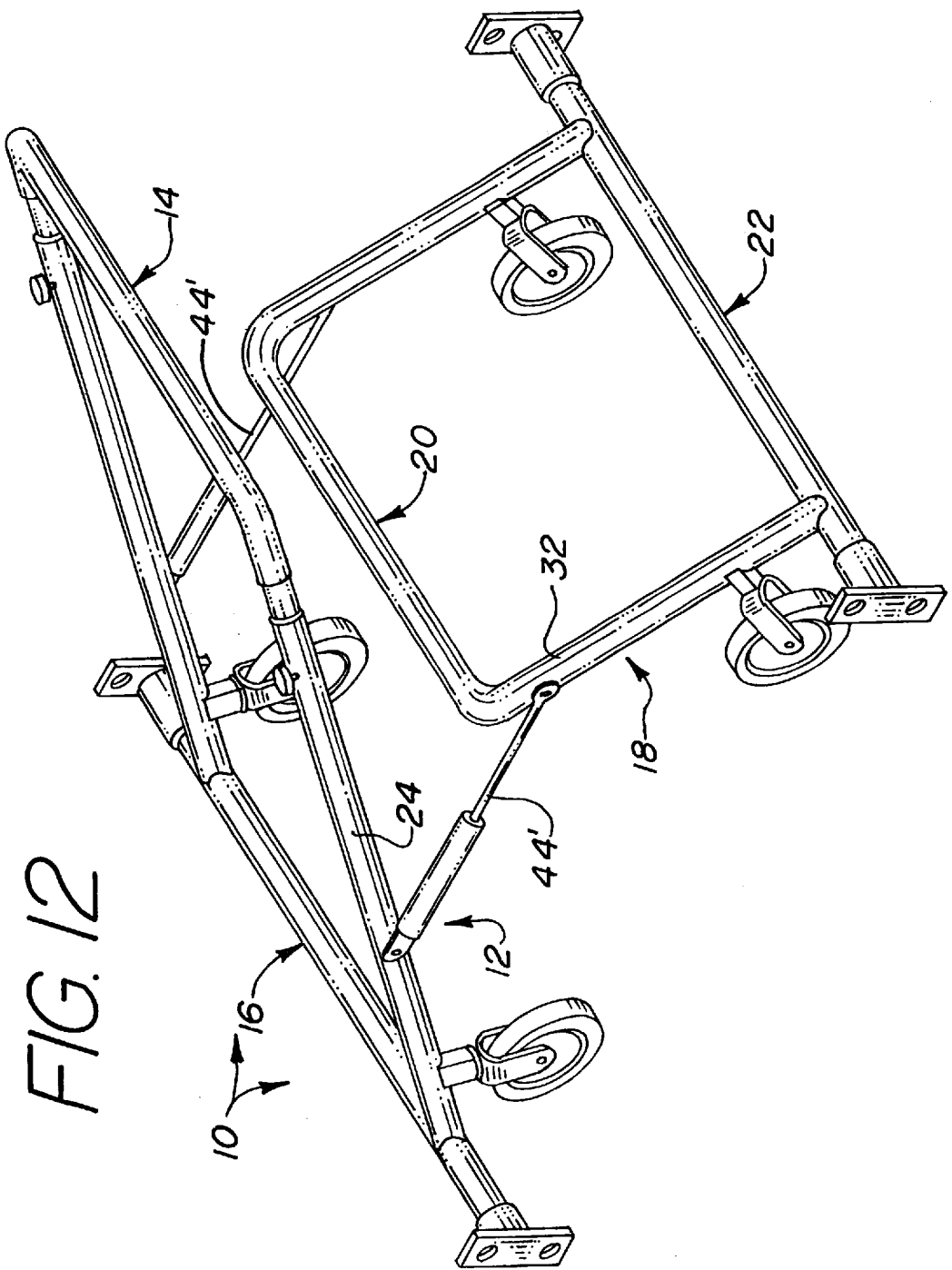

LIFT DOLLY

BACKGROUND OF THE INVENTION

1. Field of the Invention

The present invention relates to a lifting device and specifically to a two-piece moving fulcrum lever action lifting device.

2. Background of the Prior Art

Numerous devices are available for lifting and transporting objects in limited areas such as a factory floor. The devices range from the very simple to the very complex and all have the objective of moving heavy objects with limited physical input from the user. While many devices are very efficient in operation, the devices currently available suffer from one or more limitations.

Some objects provide superior lifting capability but do not provide locomotion to the lifted object. A second device, such as a simple dolly, must be utilized to accomplish the task. Devices that provide lift and locomotion capability, such as a small crane, are complex, and expensive to build and maintain. Such devices tend to be relatively difficult and time-consuming to use, often requiring the need for experienced operators.

There is therefore, a need in the art for a device capable of lifting a heavy object and moving the object to a new location. The device must be of simple design and construction and must be relatively easy to maintain. The device must be straightforward to use requiring only minimal training to operate.

SUMMARY OF THE INVENTION

The lift dolly of the present invention addresses the aforementioned needs in the art. The lift dolly is capable of lifting heavy objects clear of the ground and moving the objects to a new location. The device is simple in design and construction and is easy to maintain. In operation, the device is quick and simple to install and remove and does not require specialized training. Collapsed, the device has a small footprint facilitating easy storage and transport.

The lift dolly of the present invention is comprised of a first platform having a first pair of castors extending therefrom and a second platform having a second pair of castors extending therefrom. Each platform is generally rectangular is shape with the first platform being longer than the second platform. Attachment means extend outwardly from the opposing sides of the distal ends of each platform. Each attachment means attaches to a portion of the object to be lifted such that when each attachment means is attached, the first platform extends diagonally upwardly and the second platform extends diagonally upwardly terminating below the first platform. Each pair of castors may be in contact with the ground or be positioned above the ground in this ready state.

Introducing pressure on the proximal end of the first platform causes downward articulation of this proximal end, and upon castor contact with the ground, causes the end of the object to be lifted and raised off of the ground through the levered action of the first platform.

The downwardly articulating first platform also engages the proximal end of the second platform and causes downward articulation of the second platform's proximal end. Upon the second platform's castor contact with the ground, the opposing end of the object to the lifted is raised through the levered action of the second platform, thereby raising the entire object clear of the ground. The two platforms are secured to each other by any appropriate means and the object is free to be transported upon the castors of the two platforms. Reversing the above process lowers the object to the ground.

BRIEF DESCRIPTION OF THE DRAWINGS

FIG. 2 is an isometric view of the lift dolly in separated relationship.

FIG. 3 is a partially cut away view of the torsion spring attachment means available with the lift dolly of the present invention.

FIGS. 4–7 illustrate attachment of the lift dolly to an object to be lifted.

FIGS. 8a–8c illustrate the functioning of the spring clip attachment means available with the lift dolly.

FIGS. 9a–11b illustrate the functioning of the latch attachment means available with the lift dolly.

FIG. 12 is an isometric view of the lift dolly having telescoping rods.

Similar reference numerals refer to similar parts throughout the several views of the drawings.

DESCRIPTION OF THE PREFERRED EMBODIMENT

Figure 1:
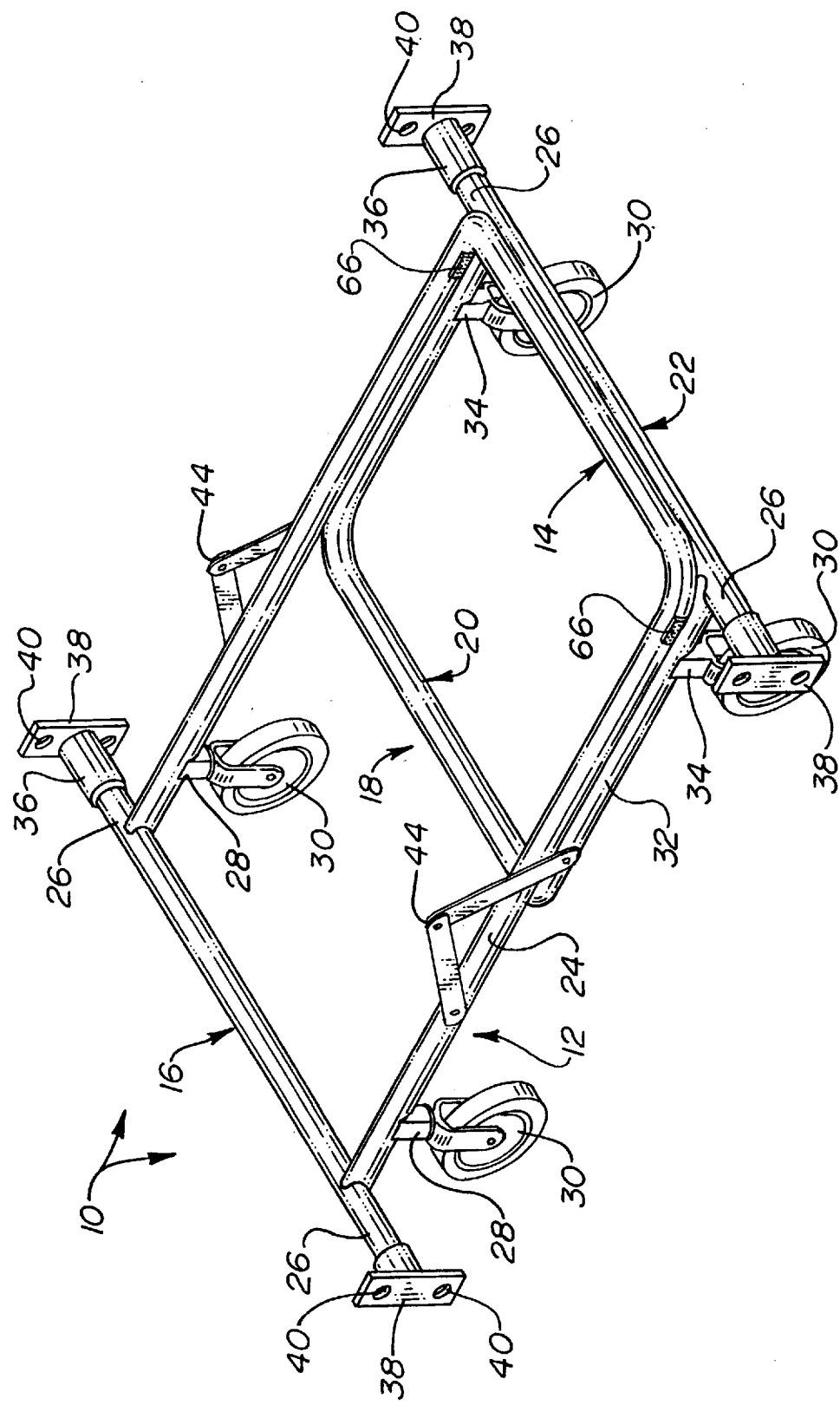
FIG. 1 is an isometric view of the lift dolly of the present invention.

Referring now to the drawings, it is seen that the lift dolly of the present invention, generally denoted by reference numeral 10, is comprised of a first platform 12 having a proximal end 14 and a distal end 16 and a second platform 18 having a proximal end 20 and a distal end 22. As seen, the first platform 12 is comprised of a generally flat and generally rectangular-shaped frame portion 24 that may be open (as illustrated) or closed. As seen in FIG. 12, the first platform 12 may be telescoping in order to extend its length as desired. A pair of rods 26 extend outwardly from the distal end 16. A first pair of castor stems 28, each having a castor 30 thereon, extend downwardly from the frame 24 proximate the distal end 16.

The second platform 18 is also comprised of a generally flat and generally rectangular-shaped frame portion 32 that may be open (as illustrated) or closed. A pair of rods 26 extend outwardly from the distal end 22. A second pair of castor stems 34, each having a castor 30 thereon, extend downwardly from the frame 32 proximate the distal end 22.

Each rod 26 can be adapted to be telescoping in order for the device 10 to lift objects of varying width.

As seen in FIG. 3, each rod 26 is rotatably received within a mounting cup 36 which is in turn connected to an anchor plate 38. Each anchor plate 38, which may be of any appropriate shape, has one or more apertures 40 located thereon. One end of a torsion spring 42 is secured to the rod 26 while the opposing end of the spring 42 is secured to the anchor plate 40.

If desired, the first platform 12 can be joined to the second platform 18 by any appropriate connection means including a connection rod 44, or as seen in FIG. 12, an energy absorbing device such as a gas strut 44', that is rotatably connected to the frame 24 of the first platform 12 and the frame 32 of the second platform 18. The connection means assure that the two platforms are not separated from each other during transport, yet permit full articulation of each platform relative to the other. Use of the gas strut 44' keeps the first platform 12 from slamming the second platform 18.

In order to utilize the lift dolly 10 of the present invention, the first platform 12 is positioned proximate an object 100 to be lifted. Each anchor plate 38 is secured to the object 100, This securement can be accomplished in any appropriate fashion including insertion of a bolt through the apertures 40 of the anchor plate 38, which apertures 40 are registerable with a corresponding set of apertures located on the object 100. Once the anchor plates 38 are secured to the object 100, the first platform 12, through the torsional action of the spring 42, articulates diagonally upwardly relative to the ground. In this relaxed state, the castors 30 will probably be positioned off of the ground although they need not be.

The second platform 18 is secured to the other end of the object 100 to be lifted in similar fashion to the securement of the first platform 12 to the object 100. After the second platform 18 is secured, the platform 18 is positioned diagonally upwardly, with the proximal end 20 terminating beneath the proximal end 14 of the first platform 12.

Downward pressure is exerted on the proximal end 14 of the first platform 12 causing the rods 26 to rotate within their respective mount cups 36. This causes the first platform's castors 30 to contact the ground, and with continued downward articulation of the proximal end 14, the first end of the object 100 is, through levered action of the first platform 12, lifted off of the ground. Coincidentally, the frame 24 of the first platform 12 engages the proximal end 20 of the second platform 18 causing downward articulation of the frame 32 and thus levered lifting of the other end of the object 100. When the first and second platforms are generally horizontal, the object 100 is lifted off of the ground and is ready for transport. It is noted that the first pair of castor stems 28 is longer relative to the second pair of castor stems 34 in order to assure level positioning of the device 10.

During the lifting process, the fulcrum of the lever system, moves toward the center thereby increasing the mechanical advantage of the system.

If desired, the springs 42 can be dispensed with altogether. Some form of ball socket, bearing structure, or any other similar structure can be substituted in order to achieve rotatable coupling of the rod 26 to the anchor plate 38. In this form, when the two platforms are delatched from one another, the platforms' proximal ends would rest on the ground as opposed to returning to their diagonally upward orientation.

The two platforms can be secured to one another in any appropriate fashion. As seen in FIGS. 8A–8C, securement can be accomplished through a spring clip that is fixedly secured to one of the frames, preferably the first frame 24, while the other frame is friction snap received within the curved seat 48 of the clip. In order to separate the two frames, the curved seat 48 is resiliently pulled back permitting the received frame to be removed therefrom. If desired, an optional foot pedal 50 can be incorporated in order to permit curved seat 48 articulation.

Alternatively, a latch system, as illustrated in FIGS. 9A–11B, can be utilized to secure the two platforms to each other. As seen, the latch system is comprised of a first pedal 52 fixedly secured to the first frame 12 by one or more structure bars 54. A second pedal 56 having a J-hook 58 that has a curved outer portion 60 and a curved inner portion 62, extending downwardly therefrom, is secured to the frame 24 by one or more springs 64. The J-hook 58 is also rotatably secured to the structure bar 54 of the first pedal 52. As seen in FIG. 9A, in a normal position, the J-hook 58 extends downwardly in generally normal alignment to the frame 24. As the second frame 32 engages the outer portion 60, the frame 32 slides up the outer portion 60, pushing the J-hook 58 outwardly, as seen in FIG. 10A. Once the frame 32 clears the outer portion 60, the one or more springs 64 causes the J-hook 58 to return to normal alignment with the first frame 24 causing the second frame 32 to be received within the inner portion 62 of the J-hook 58, as seen in FIG. 11A. The bias of the spring 64 retains the second frame 32 in this latched position. The first pedal 52 assists in positioning the first frame 24 properly for latching with the second frame 32.

In order to unlatch the two frames, the second pedal 56 is depressed causing outward articulation of the J-hook 58, which in turn releases the second frame 32 allowing the frame 32 to drop clear.

As a second alternative, magnets 66 may be strategically placed on one or both frames. The magnets 66 may be electrical or permanent.

It is understood that the other securement means can be utilized in keeping within the scope of the invention and the above-described means can be positioned on one or both sides of the frames as desired. It is also understood that minor modifications to the frame may need to be made if a solid frame is utilized.

While the invention has been particularly shown and described with reference to an embodiment thereof, it will be appreciated by those skilled in the art that various changes in form and detail may be made without departing from the spirit and scope of the invention.

I claim:

1. A lift dolly for lifting and moving of an object comprising:

a first frame having a first proximal end and a first distal end;

a second frame having a second proximal end and a second distal end;

a first pair of castor stems, each castor stem having a castor thereon extending downwardly from the first frame;

a second pair of castor stems, each castor stem having a castor thereon extending downwardly from the second frame;

a first pair of rods extending outwardly in opposing relation from the first frame proximate the first distal end;

a second pair of rods extending outwardly in opposing relation from the second frame proximate the second distal end;

a first pair of attachment means for attaching the first frame to the object, rotatably connected to the first pair of rods;

a second pair of attachment means for attaching the second frame to the object, rotatably connected to the second pair of rods;

a securement means for releasably securing the first frame and the second frame to one another;

wherein the first pair of attachment means is attached to the object and the second pair of attachment means is attached to the object and the first proximal end is articulated downwardly thereby lever-lifting part of the object and also articulating the second proximal end thereby lever lifting another part of the object;

wherein the first pair of attachment means and the second pair of attachment means each comprise:

a mounting cup for rotatably receiving one of the rods;

an anchor plate attached to the mounting cup; and wherein each of the anchor plate attaches to the object; and wherein the first pair of attachment means and the second pair of attachment means each further comprise a torsion spring having a first end attached to the rod and a second end attached to the anchor plate.

2. The lift dolly as in claim 1 wherein each anchor plate has at least one aperture for securing the anchor plate to the object.

3. The lift dolly as in claim 1 wherein the securement means comprises one or more spring clips each spring clip having one end secured to one of the frames and another end having a generally resilient curved portion for friction snap receiving the other frame.

4. The lift dolly as in claim 3 further comprising a foot pedal attached to at least one of the one or more spring clips.

5. The lift dolly as in claim 1 wherein the securement means comprises at least one latch.

6. The lift dolly as in claim 5 wherein the at least one latch comprises:

at least one structure bar extending upwardly from the first frame;

a first pedal secured to the one or more structure bars;

a second pedal;

a J-hook extending downwardly from the second pedal and rotatably secured to the at least one structure bar; and at least one spring having a first end secured to the first frame and a second end secured to the second pedal.

7. The lift dolly as in claim 1 wherein the securement means is comprised of at least one magnet attached to one of the frames.

8. The lift dolly as in claim 7 wherein the at least one magnet is electric.

9. The lift dolly as in claim 7 wherein the at least one magnet is permanent.

10. The lift dolly as in claim 1 wherein the first pair of castor stems is longer relative to the second pair of castor stems.

11. A lift dolly for selectively lifting and transporting an object, the lift dolly comprising:

a first frame including first, second and third elongated members, wherein said second and third elongated members of said first frame extend away from said first elongated member of said first frame;

a second frame including first, second and third elongated members, wherein said second and third elongated members of said second frame extend away from said first elongated member of said second frame and toward said first elongated member of said first frame;

said first elongated member of said first frame being spaced apart from said first elongated member of said second frame;

a first wheel system extending downwardly from said first frame and a second wheel system extending downwardly from said second frame;

first and second connection devices for connecting said first frame to the object;

third and fourth connection devices for connecting said second frame to the object;

a frame securing device for releasably securing said first frame to said second frame;

said first frame including an actuation portion for being downwardly articulated so that when the actuation portion is downwardly articulated said first and second frames move relative to one another and lift the object off of a ground surface so that the object becomes supported on the ground surface by said first and second wheel systems; and wherein at least a portion of one of said second and third elongated members of said first frame is located at an elevation greater than a part of said second frame when the object is in a position lifted off of the ground and supported by said first and second wheel systems.

12. The lift dolly of claim 11, wherein said first elongated member of said first frame is parallel to said first elongated member of said second frame.

13. The lift dolly of claim 11, wherein portions of said second and third elongated members of each of said first and second frames are located within a common plane when the object if lifted off of the ground and supported by said first and second wheel systems.

14. The lift dolly of claim 11, wherein at least a portion of one of said second and third elongated members of said first frame is located at a position directly over top of a part of said second frame when the object is in a position lifted off of the ground and supported by said first and second wheel systems.

* * * * *